(12) United States Patent
Xia et al.

(10) Patent No.: US 11,355,831 B2
(45) Date of Patent: Jun. 7, 2022

(54) ANTENNA SYSTEM AND MOBILE TERMINAL

(71) Applicant: AAC Technologies Pte. Ltd., Singapore (SG)

(72) Inventors: Xiaoyue Xia, Shenzhen (CN); Chao Wang, Shenzhen (CN); Zhengdong Yong, Shenzhen (CN)

(73) Assignee: AAC Technologies Pte. Ltd., Singapore (SG)

( * ) Notice: Subject to any disclaimer, the term of this patent is extended or adjusted under 35 U.S.C. 154(b) by 318 days.

(21) Appl. No.: 16/236,514

(22) Filed: Dec. 30, 2018

(65) Prior Publication Data
US 2019/0229405 A1 Jul. 25, 2019

(30) Foreign Application Priority Data
Jan. 25, 2018 (CN) .......................... 201810070585.2

(51) Int. Cl.
| | | |
|---|---|---|
| *H01Q 1/24* | (2006.01) | |
| *H01Q 3/38* | (2006.01) | |
| *H04M 1/02* | (2006.01) | |
| *H01Q 21/06* | (2006.01) | |
| *H01Q 1/38* | (2006.01) | |
| *H01Q 21/00* | (2006.01) | |

(52) U.S. Cl.
CPC .............. *H01Q 1/243* (2013.01); *H01Q 1/38* (2013.01); *H01Q 3/38* (2013.01); *H01Q 21/065* (2013.01); *H04M 1/0277* (2013.01); *H04M 1/0283* (2013.01); *H01Q 21/0025* (2013.01)

(58) Field of Classification Search
CPC ........ H01Q 1/241; H01Q 1/242; H01Q 1/243; H01Q 1/38; H01Q 3/26; H01Q 3/2617; H01Q 3/30; H01Q 3/34; H01Q 3/36; H01Q 3/38; H01Q 21/061; H01Q 21/062; H01Q 21/064; H01Q 21/065; H01Q 21/067; H01Q 21/0025; H01Q 21/22; H01Q 1/52; H01Q 1/521; H01Q 1/525
See application file for complete search history.

(56) References Cited

U.S. PATENT DOCUMENTS

| | | | |
|---|---|---|---|
| 10,418,687 B2 * | 9/2019 | Mow ...................... | H01Q 1/243 |
| 2017/0207516 A1 * | 7/2017 | Koo .................... | H04M 1/0277 |
| 2018/0309189 A1 * | 10/2018 | Gu ........................... | H01Q 1/48 |

* cited by examiner

*Primary Examiner* — Andrea Lindgren Baltzell
(74) *Attorney, Agent, or Firm* — IPro, PLLC; Na Xu

(57) ABSTRACT

The present disclosure provides an antenna system, applied to a mobile terminal, where the mobile terminal includes a 3D glass housing and a PCB board accommodated in the 3D glass housing; the antenna system includes at least one antenna assembly; the flexible circuit board includes a first portion that is bent and extends toward a first direction and a second portion that is bent and extends toward a second direction; the antenna assembly further includes a first antenna array disposed on the first portion and a second antenna array disposed on the second portion; In the present disclosure, the antenna system is small, the antenna is closely bonded with the 3D glass housing, the mechanical stability is high, and the antenna does not easily fail or deteriorate in performance due to damages.

8 Claims, 7 Drawing Sheets

ANTENNA SYSTEM AND MOBILE TERMINAL

CROSS-REFERENCE TO RELATED APPLICATIONS

This application claims the priority benefit of Chinese Patent Application Ser. No. 201810070585.2 and filed on Jan. 25, 2018, the entire content of which is incorporated herein by reference.

TECHNICAL FIELD

The present disclosure relates to antenna technologies, and in particular, to an antenna system and a mobile terminal.

BACKGROUND

With the development of mobile communication technologies, mobile phones, PADs, notebook computers, and the like have gradually become important electronic products in life, and such electronic products have been updated to include an antenna system and therefore become electronic communication products having a communication function.

As the focus of research and development in the global industry, 5G has three main application scenarios: enhanced mobile broadband, large-scale machine communication, and high-reliability and low-latency communication. The three application scenarios respectively correspond to different key indicators, where a user peak velocity in the enhanced mobile broadband scenario is 20 Gbps, and a minimum user experience rate is 100 Mbps. A high carrier frequency and large bandwidth characteristic unique to millimeter waves is a main means to achieve a 5G ultra-high data transmission rate. Therefore, rich bandwidth resources of a millimeter wave frequency band provide a guarantee for the high-speed transmission rate.

However, due to severe spatial loss of electromagnetic waves in the millimeter wave frequency band, a wireless communication system using the millimeter wave frequency band needs to use a phased array architecture. Phases of array elements are distributed according to a particular rule by using a phase shifter, so that a high-gain beam is formed, and the beam is enabled, through a phase shift change, to scan within a particular space. A scanning coverage of a single phased array antenna is usually less than a hemisphere. If a communication terminal such as a mobile phone uses an antenna system in a form of a single array, a problem that a signal is unstable may be caused.

Therefore, it is necessary to provide a new antenna system and a communication terminal to resolve foregoing problems.

BRIEF DESCRIPTION OF THE DRAWINGS

To illustrate the technical solutions in the embodiments of the present disclosure more clearly, the following briefly describes the accompanying drawings required for describing the embodiments. Apparently, the accompanying drawings in the following descriptions merely show some embodiments of the present disclosure, and persons of ordinary skill in the art can derive other drawings from these accompanying drawings without creative efforts.

DETAILED DESCRIPTION

The following clearly and completely describes the technical solutions in the embodiments of the present disclosure with reference to the accompanying drawings in the embodiments of the present disclosure. Apparently, the described embodiments are some of the embodiments of the present disclosure rather than all of the embodiments. All other embodiments obtained by a person skilled in the art based on the embodiments of the present disclosure without creative efforts shall fall within the protection scope of the present disclosure.

Figure 1:
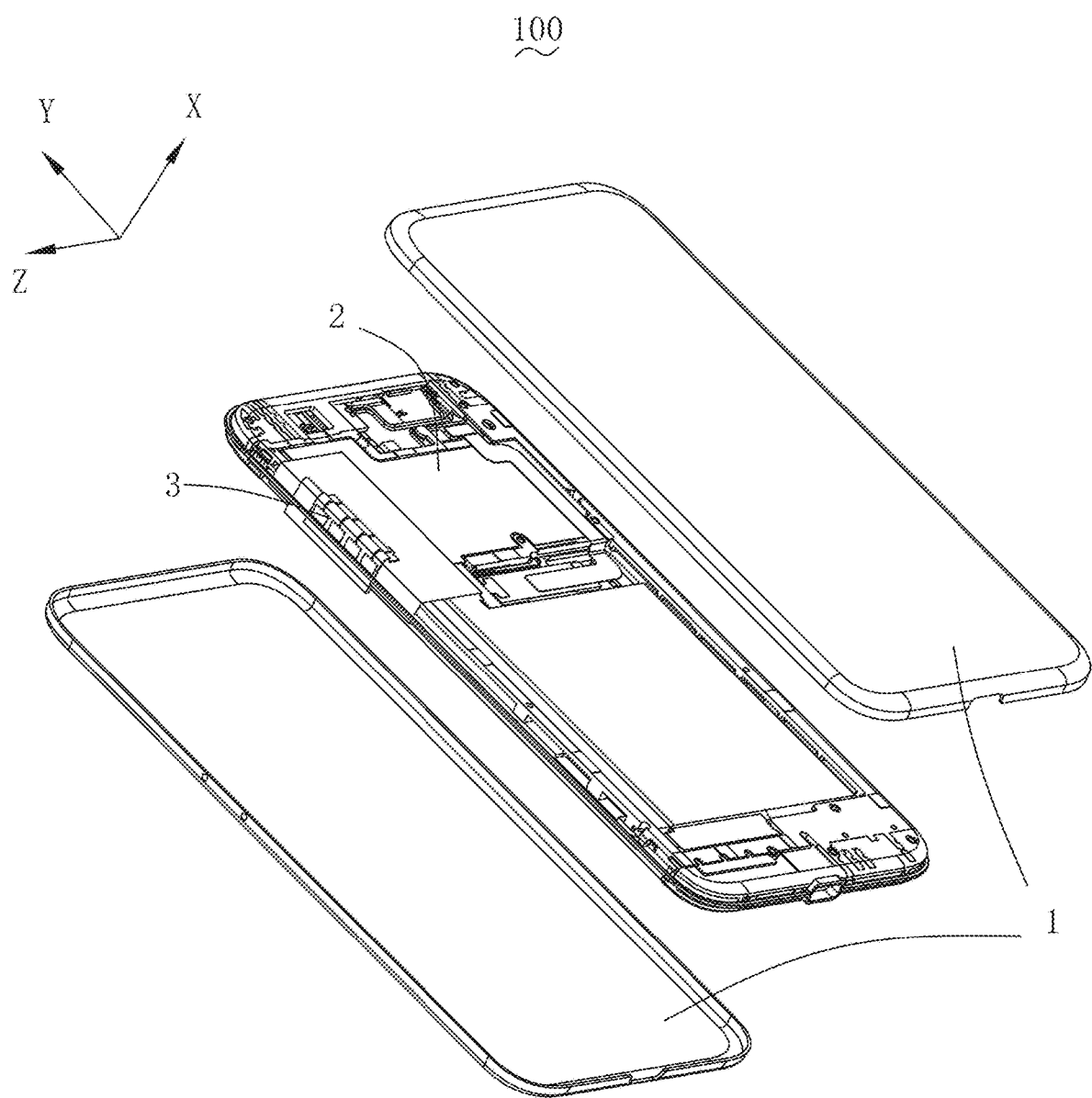
FIG. 1 is a schematic structural diagram of a mobile terminal according to the present disclosure.

Referring to FIG. 1, an embodiment of the present disclosure provides a mobile terminal 100, for example, a mobile phone, including a 3D glass housing 1, and a PCB board 2 and an antenna system that are accommodated in the 3D glass housing 1. The antenna system includes at least one antenna assembly 3.

Figure 2:
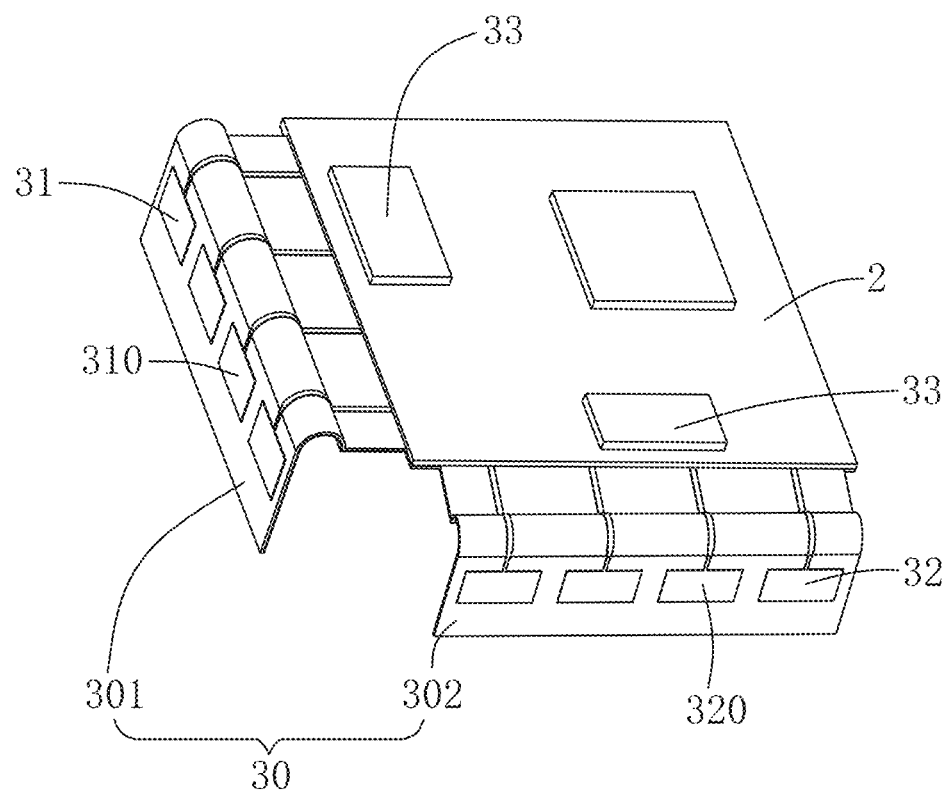
FIG. 2 is a schematic structural diagram of an antenna assembly according to the present disclosure.

Referring to both FIG. 1 and FIG. 2, the antenna assembly 3 includes a flexible circuit board 30 that is accommodated in the 3D glass housing 1 and that is bonded with and fixed to the PCB board 2. One end of the flexible circuit board 30 is bonded with and fixed to the PCB board 2, and the other end is bent to be closely attached to an inner side surface of the 3D glass housing 1.

The flexible circuit board 30 includes a first portion 301 that is bent and extends toward a first direction and a second portion 302 that is bent and extends toward a second direction. The first direction and the second direction may be the same direction, or may be different directions. In specific embodiments provided in the present disclosure, the first direction is perpendicular to the second direction.

The antenna assembly 3 includes a first antenna array 31 disposed on the first portion 301 and a second antenna array 32 disposed on the second portion 302. The first antenna array 31 and the second antenna array 32 are configured to radiate and receive electromagnetic waves. The first antenna array 31 and the second antenna array 32 may be bent respectively with the first portion 301 and the second portion 302, so that the first antenna array 31 and the second antenna array 32 are closely attached to the inner side surface of the 3D glass housing 1 respectively by using the first portion 301 and the second portion 302. Specifically, the first antenna array 31 and the second antenna array 32 are respectively printed on the first portion 301 and the second portion 302, so that the thickness of the antenna assembly 3 is greatly reduced and the antenna assembly 3 is easily bent with the flexible circuit board 30 on the premise that the structural stability of the first antenna array 31 and the second antenna array 32 is ensured.

Figure 3A:
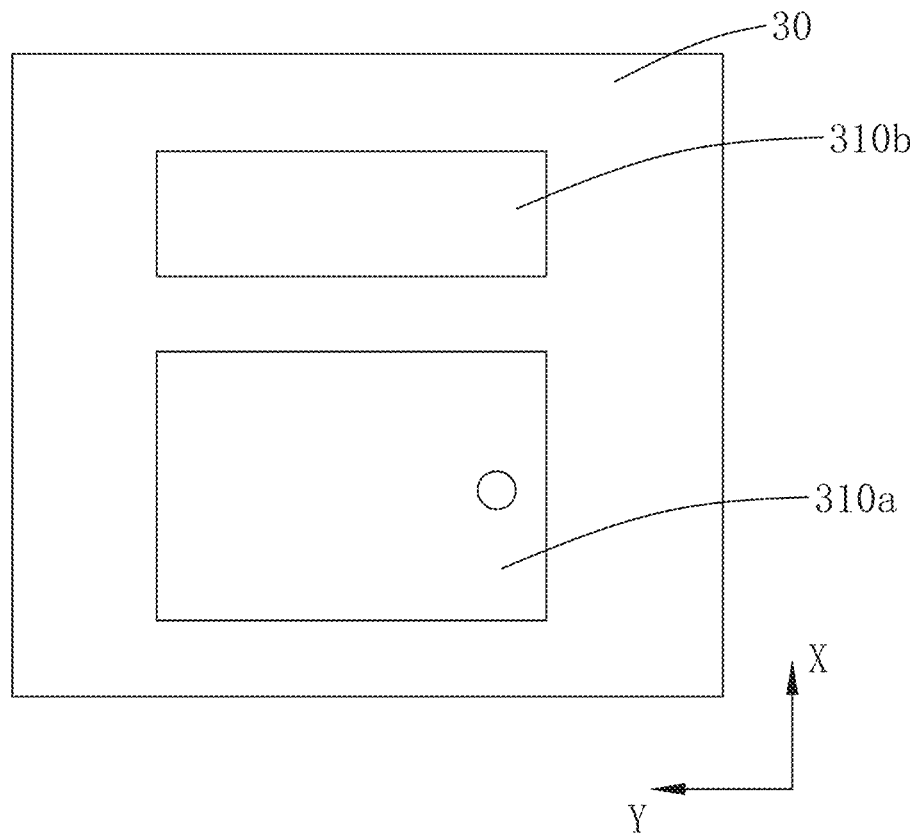
FIG. 3a and FIG. 3b are schematic structural diagrams of a radiating antenna according to the present disclosure.
Figure 3B:
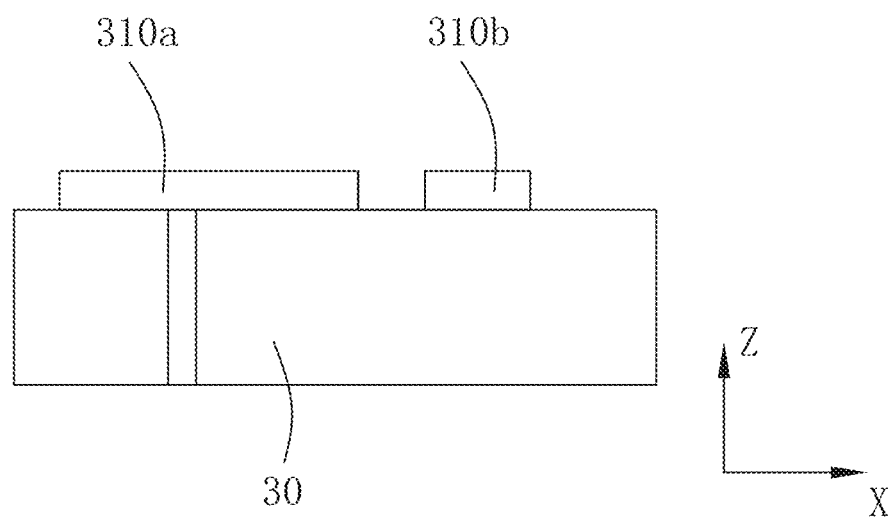
Figure 5:
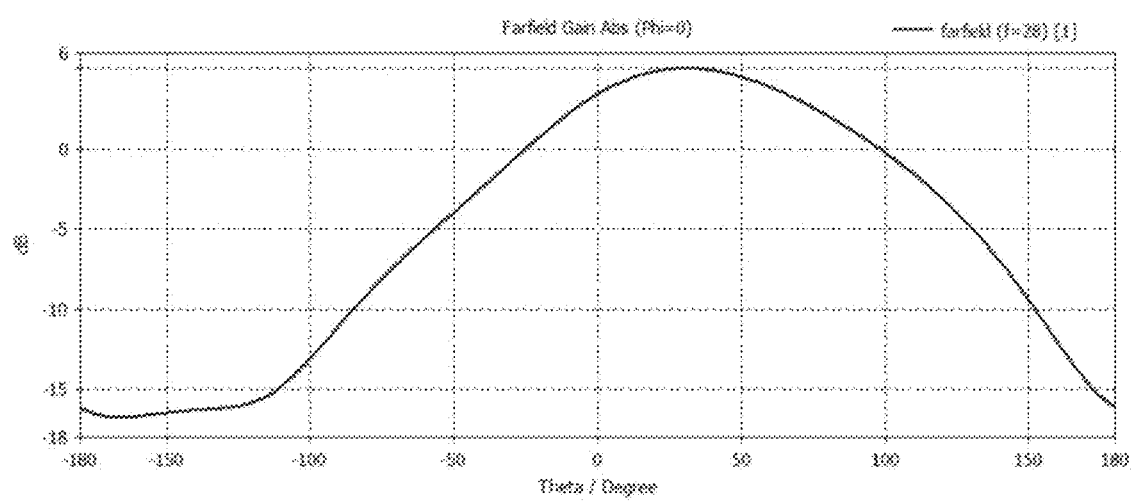
FIG. 5 is a directional diagram of a radiating antenna according to the present disclosure.

The first antenna array 31 includes a plurality of radiating antennas 310, and the second antenna array 32 includes a plurality of radiating antennas 320. In this embodiment, there are four radiating antennas 310. Specifically referring to FIG. 3a and FIG. 3b, the radiating antenna 310 includes a radiating portion 310a and a director 310b, and the radiating portion 310a is spaced away from and coupled to the director 310b. The director 310b has a directing function. Specifically, the director 310b directs a radiation beam of the radiating antenna 310 toward a direction in which the director 310b is located, to implement beam tilting. Using the coordinate axes in FIG. 3a and FIG. 3b for reference, the radiating portion 310a of the radiating antenna 310 is arranged on an XY plane; when the director 310b is not disposed, a radiation beam thereof is perpendicular to the XY plane and faces a Z-axis positive axis direction; when the director 310b is disposed, the radiation beam originally pointing to the Z-axis positive axis is tilted toward an X-axis positive axis direction, that is, toward the direction of the director 310b, and a directivity pattern thereof is shown in FIG. 5.

Figure 4:
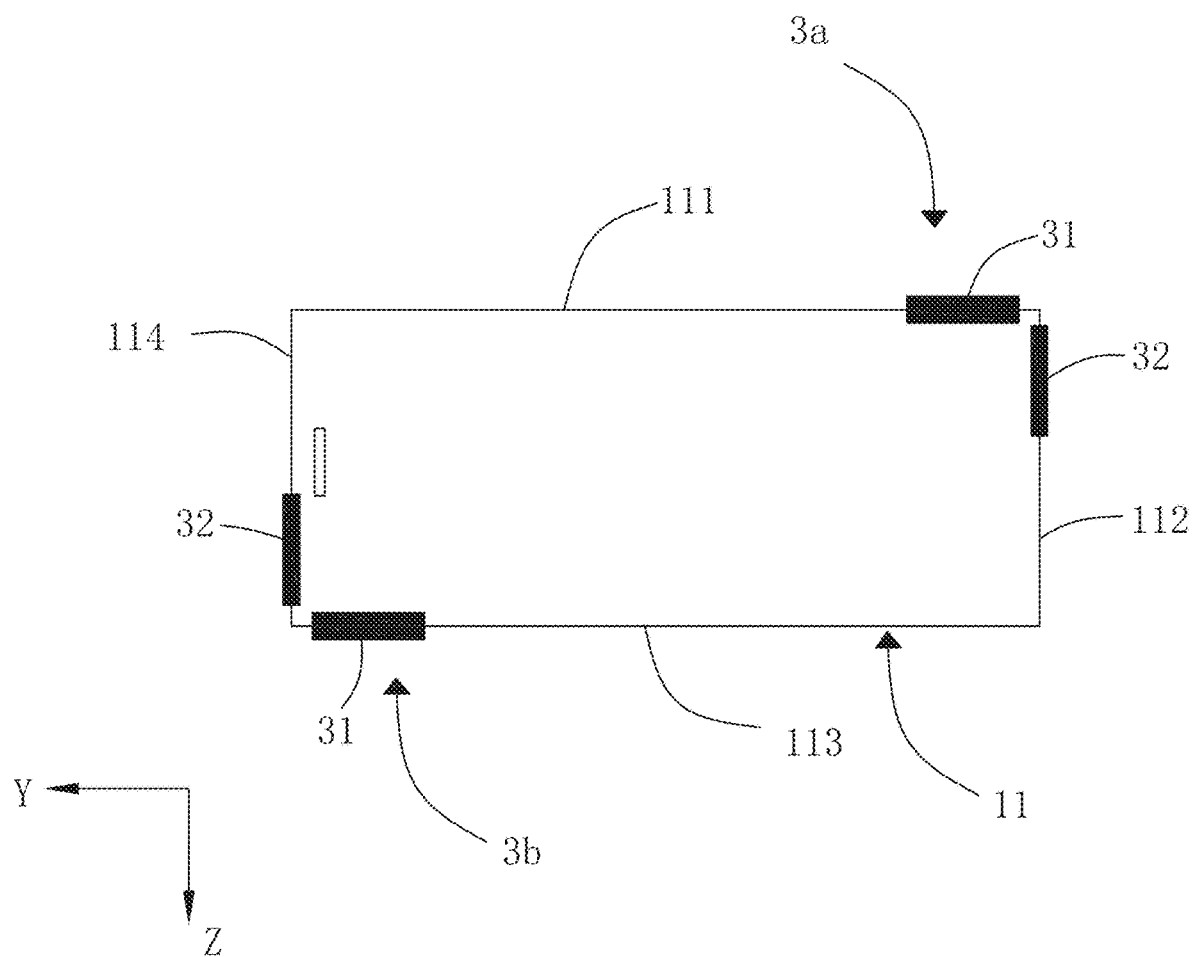
FIG. 4 is a schematic diagram of a layout location of an antenna system according to the present disclosure.

In this embodiment, as shown in FIG. 4, the 3D glass housing 1 includes a 3D glass side wall 11. The antenna system includes two antenna assemblies 3, which are respectively a first antenna assembly 3a and a second antenna assembly 3b. Each of the antenna assemblies includes the first antenna array 31 and the second antenna array 32, and the first antenna array 31 and the second antenna array 32 are both attached to an inner side surface of the 3D glass side wall 11. Specifically, the 3D glass side wall 11 includes a first long-edge side wall 111, a first short-edge side wall 112, a second long-edge side wall 113, and a second short-edge side wall 114 that are connected end to end. The first antenna assembly 3a is disposed at a corner at a joint between the first long-edge side wall 111 and the first short-edge side wall 112, and the second antenna assembly 3b is disposed at a corner at a joint between the second long-edge side wall 113 and the second short-edge side wall 114. The first antenna array 31 of the first antenna assembly 3a is attached to an inner side surface of the first long-edge side wall 111, the second antenna array 32 of the first antenna assembly 3a is attached to an inner side surface of the first short-edge side wall 112, the first antenna array 31 of the second antenna assembly 3b is attached to an inner side surface of the second long-edge side wall 113, and the second antenna array 32 of the second antenna assembly 3b is attached to an inner side surface of the second short-edge side wall 114. The antenna array is placed on the 3D glass side wall 11, to reduce the effect of a metal body in the mobile terminal 100 on radiation performance of the radiating antennas 310 and 320, and reduce loss in electromagnetic wave space.

Figure 6:
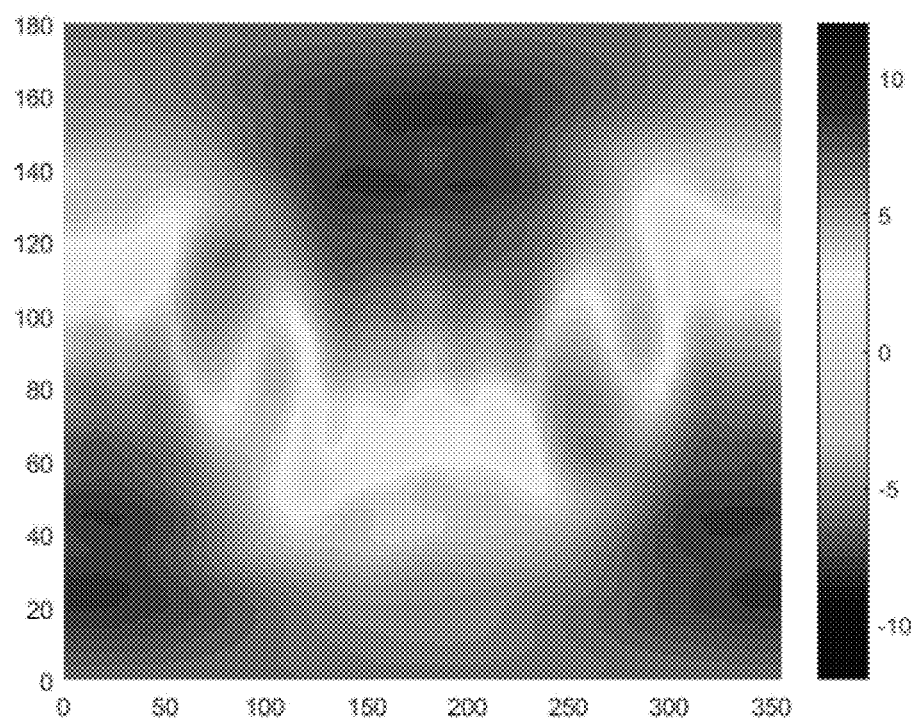
FIG. 6 is a diagram of coverage efficiency of an antenna system according to the present disclosure.
Figure 7:
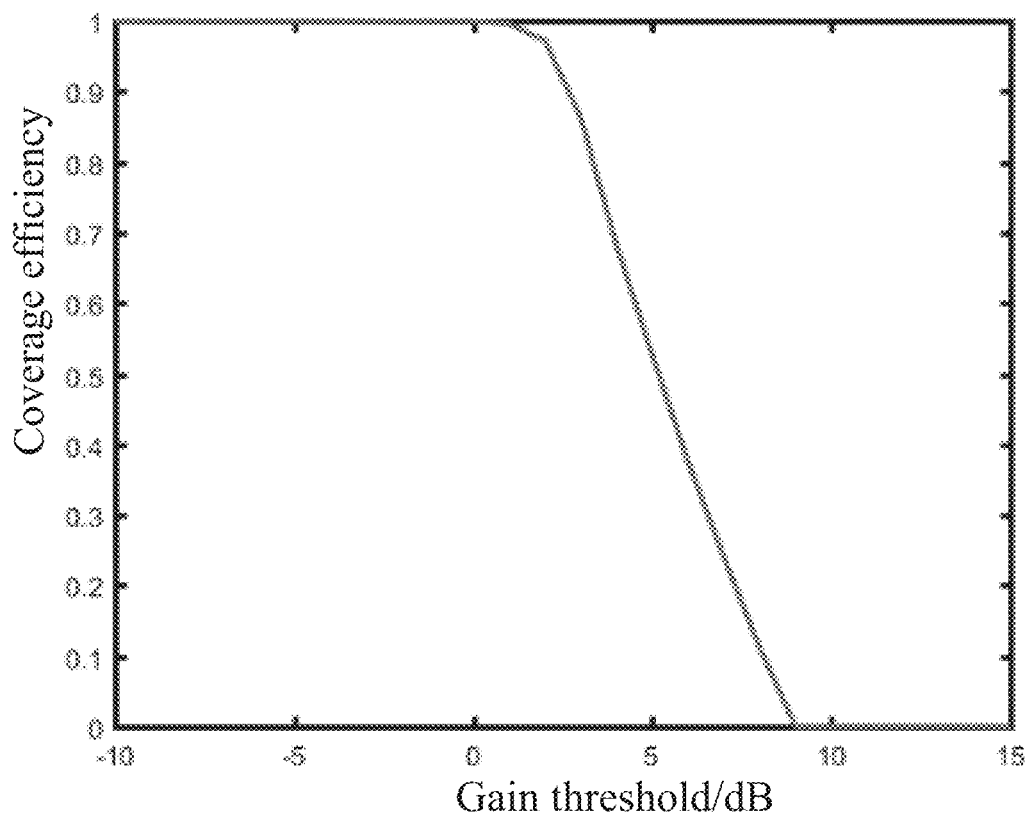
FIG. 7 is a diagram of an overall scanning mode of an antenna system according to the present disclosure.

In this embodiment, in the antenna system shown in FIG. 4, the director 310b in the first antenna array 31 and the second antenna array 32 of each antenna assembly is in an opposite location relationship with the radiating portion 310a, so that radiating beams of two antenna arrays in the same antenna assembly are tilted toward opposite directions. For example, in the first antenna assembly 3a, the director 310b of the first antenna array 31 is located in the X-axis positive axis direction relative to the radiating portion 310a, the director 310b of the second antenna array 32 is located in the X-axis negative axis direction relative to the radiating portion 310a, and then a radiating beam of the first antenna array 31 faces an outward direction of the first long-edge side wall 111 and is tilted toward the X-axis positive axis direction, and a radiating beam of the second antenna array 32 faces an outward direction of the first short-edge side wall 112 and is tilted toward the X-axis negative axis direction. Similarly, in the second antenna assembly 3b, the radiating beam of the first antenna array 31 faces an outward direction of the second long-edge side wall 113 and is tilted toward the X-axis positive axis direction, and the radiating beam of the second antenna array 32 faces an outward direction of the second short-edge side wall 114 and is tilted toward the X-axis negative axis direction. In this way, each direction can be covered by radiating beams by using the first antenna assembly 3a and the second antenna assembly 3b and four antenna arrays therein. In this way, a high gain and a high coverage efficiency of the antenna system can be implemented. Specifically, as shown in FIG. 6 and FIG. 7, full space beam coverage is basically implemented, and the coverage efficiency is high.

It should be noted that in other embodiments, beam tilting directions of the first antenna array 31 and the second antenna array 32 are opposite to those in this embodiment, and are not limited, provided that beam radiation is in directions around the mobile terminal by using a combination of two antenna assemblies.

In a preferred embodiment of the present disclosure, the radiating antennas 310 and 320 are millimeter wave antennas, so that the antenna assembly 3 has a higher signal transmission rate.

In this embodiment, the antenna system further includes a phase shifter 33 disposed on the PCB board, and each of the antenna assemblies is electrically connected to the phase shifter 33 to implement beam scanning.

The antenna assembly 3 further includes an antenna control circuit, a feeding network, and the like that are disposed on the PCB board 2. The antenna control circuit is connected to the first antenna array 31 and the second antenna array 32, to implement integration with a main board in the mobile terminal 100.

Compared with related technologies, the antenna assembly 3 provided in the present disclosure has the following beneficial effects:

1) the feeding network, the phase shifter, and an antenna control circuit such as the control circuit are disposed on the PCB board 2, to implement integration with a main board;

2) the radiating antenna is attached to the flexible circuit board 30, to facilitate bending, and implement close attachment between the radiating antenna and the 3D glass housing 1;

3) the radiating antenna is placed on the 3D glass side wall 11, to reduce the effect of the metal body in the mobile terminal 100 on radiation performance of the radiating antenna, and reduce loss in electromagnetic wave space;

4) the radiating antenna is placed on the flexible circuit board 30, and the feeding network, the phase shifter, and the antenna control circuit such as the control circuit are disposed on the PCB board 2, so that the overall size of the radiating antenna is greatly reduced while the internal space of the mobile terminal 100 is fully used;

5) the flexible circuit board 30 is used to implement close attachment between the radiating antenna and the 3D glass housing 1, and in this way, the radiation performance of the radiating antenna is not affected, and a directivity pattern distortion generated by air existing between the 3D glass housing 1 and the radiating antenna is also avoided;

6) the radiating antenna is closely attached to an inner side surface of the 3D glass housing 1 by using the flexible circuit board 30, so that the antenna assembly 3 has higher mechanical stability and is not damaged, does not fail, or does not deteriorate in radiation performance due to reasons such as drop or vibration; and 7) the antenna assembly includes two antenna arrays, and by using a beam tilting technology, one mobile terminal can implement full space beam coverage by using only two antenna assemblies, so that the number of antenna arrays is reduced.

The foregoing descriptions are merely embodiments of the present disclosure. It should be pointed out herein that a person of ordinary skill in the art may further make improvements without departing from the inventive concept of the present disclosure. The improvements all fall within the protection scope of the present disclosure.

What is claimed is:

1. An antenna system, applied to a mobile terminal, wherein the mobile terminal comprises a 3D glass housing and a PCB board accommodated in the 3D glass housing; wherein
the antenna system comprises at least one antenna assembly;
each antenna assembly comprises a flexible circuit board that is accommodated in the 3D glass housing and that is bonded with and fixed on the PCB board;
the flexible circuit board comprises a first portion that is bent and extends toward a first direction and a second portion that is bent and extends toward a second direction;
the antenna assembly further comprises a first antenna array disposed on the first portion and a second antenna array disposed on the second portion, the first antenna array and the second antenna array are respectively printed on the first portion and the second portion and bent with the flexible circuit board; and
the first antenna array and the second antenna array are attached to an inner side surface of the 3D glass housing respectively by using the first portion and the second portion.

2. The antenna system according to claim 1, wherein the 3D glass housing comprises a 3D glass side wall, and the first antenna array and the second antenna array are both attached to an inner side surface of the 3D glass side wall.

3. The antenna system according to claim 2, wherein the first antenna array and the second antenna array both comprise a plurality of radiating antennas, and the plurality of radiating antennas are disposed in an array along a peripheral direction of the 3D glass side wall.

4. The antenna system according to claim 3, wherein the radiating antenna is a millimeter wave antenna.

5. The antenna system according to claim 3, wherein the radiating antenna comprises a radiating portion and a director.

6. The antenna system according to claim 5, wherein the antenna system further comprises a phase shifter disposed on the PCB board, and the antenna assembly is electrically connected to the phase shifter to implement beam scanning.

7. The antenna system according to claim 1, wherein
the 3D glass side wall comprises a first long-edge side wall, a first short-edge side wall, a second long-edge side wall, and a second short-edge side wall that are connected end to end;
the antenna system comprises a first antenna assembly disposed at a joint between the first long-edge side wall and the first short-edge side wall and a second antenna assembly disposed at a joint between the second long-edge side wall and the second short-edge side wall.

8. The antenna system according to claim 7, wherein the first antenna array of the first antenna assembly is attached to an inner side surface of the first long-edge side wall, the second antenna array of the first antenna assembly is attached to an inner side surface of the first short-edge side wall, the first antenna array of the second antenna assembly is attached to an inner side surface of the second long-edge side wall, and the second antenna array of the second antenna assembly is attached to an inner side surface of the second short-edge side wall.

* * * * *